United States Patent [19]

Sampedro

[11] Patent Number: 4,692,053
[45] Date of Patent: Sep. 8, 1987

[54] DIRECT DRIVE FAN COUPLING ASSEMBLY

[75] Inventor: Manuel Sampedro, 21011 S.W. 122 Ct., Miami, Fla. 33177

[73] Assignees: Manuel Sampedro, Miami; Russell T. Kohuth, Hollywood, both of Fla. ; a part interest to each

[21] Appl. No.: 912,523

[22] Filed: Sep. 29, 1986

Related U.S. Application Data

[63] Continuation-in-part of Ser. No. 842,784, Mar. 24, 1986, abandoned.

[51] Int. Cl.$^4$ .......................... F01P 1/00; F01P 7/00; F16D 1/00
[52] U.S. Cl. ........................................ 403/24; 403/3; 403/356; 403/315; 403/406.1; 123/41.49; 416/244 R; 416/169 A; 192/58 B
[58] Field of Search .................... 403/24, 25, 3, 355, 403/356, 315, 316, 317, 406.1; 192/58 B; 123/41.49; 416/150, 169 A, 244 R; 464/182

[56] References Cited

U.S. PATENT DOCUMENTS

| | | | |
|---|---|---|---|
| 2,492,029 | 7/1946 | Beier | 416/169 A X |
| 2,685,478 | 8/1954 | Booth | 403/356 X |
| 2,956,604 | 10/1960 | Crotty | 403/316 X |
| 3,075,369 | 1/1963 | Swire | 464/182 |
| 3,585,815 | 6/1971 | Hubbard | 464/182 |
| 3,824,807 | 7/1974 | Hecht | 123/41.49 X |
| 3,990,802 | 11/1976 | Corona | 403/24 |
| 4,066,048 | 1/1978 | Premus | 123/41.49 |
| 4,180,024 | 12/1979 | Hernandez | 403/406.1 X |
| 4,274,754 | 6/1981 | Cohen | 403/317 X |
| 4,320,723 | 3/1982 | Wendling et al. | 192/58 B |
| 4,384,824 | 5/1983 | Woods | 416/169 A |

Primary Examiner—Cornelius J. Husar
Assistant Examiner—Todd G. Williams
Attorney, Agent, or Firm—John Cyril Malloy

[57] ABSTRACT

A universal, direct drive fan coupling designed to attach a radiator cooling fan to a water pump of an internal combustion engine for an automobile or like vehicle wherein the subject coupling is specifically designed to efficiently replace the fan idling clutch present in many relatively current models of American made automobiles, or like vehicles. The inherent versatility of the subject direct drive coupling enables the elimination of any clutch mechanism normally found in the aforementioned automobile type which is positioned between the rotating shaft associated with the conventional cooling fan and a subsequently positioned and driven component of the circulation system such as the water pump.

13 Claims, 19 Drawing Figures

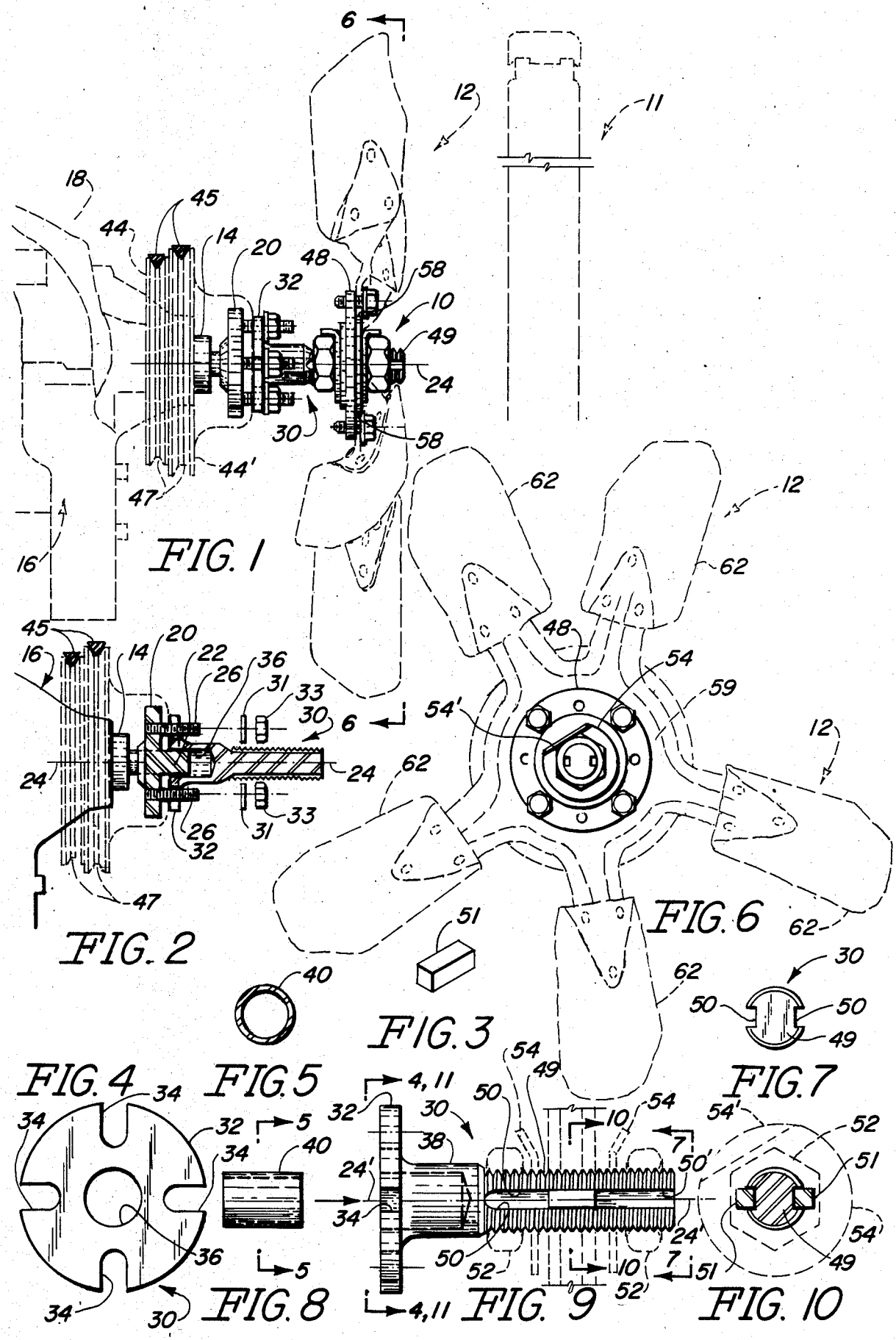

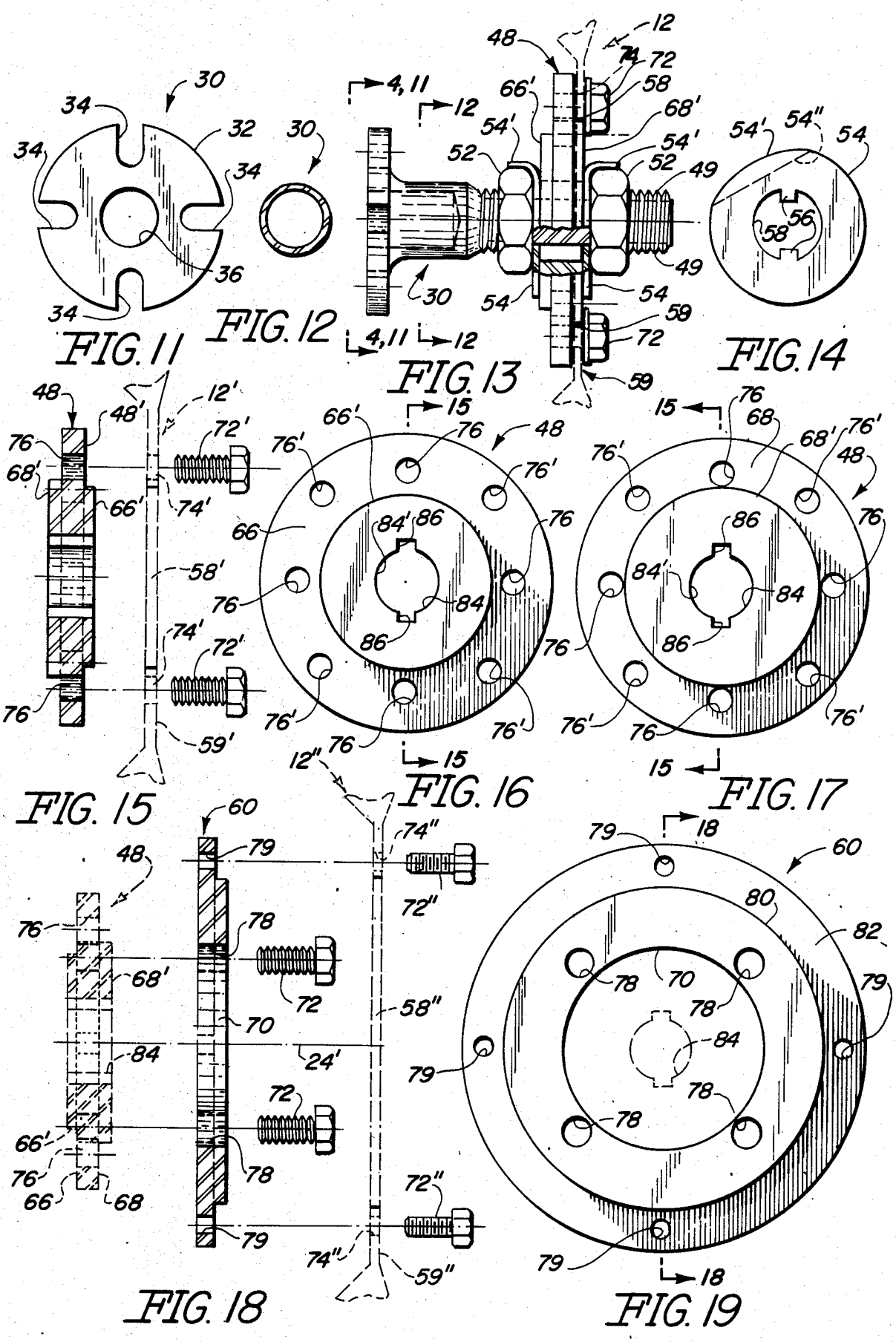

DIRECT DRIVE FAN COUPLING ASSEMBLY

BACKGROUND OF THE INVENTION

This is a continuation-in-part application of presently copending patent application Ser. No. 842,784 filed on Mar. 24, 1986, now abandoned.

FIELD OF THE INVENTION

This invention relates to a direct drive coupling used to support, rotate and interconnect a conventional cooling fan structure with a water pump to the exclusion of intervening fan idling clutch assemblies as commonly used on relatively current models of especially American made automobiles. The elimination of any clutching assembly thereby eliminates the danger of overheating in situations where the intervening clutch mechanism or assembly breaks down and prevents the cooling fan from rotating which in turn causes overheating of the engine and the attendant damage to the I.C. engine if such were continued to be operated in such state.

DESCRIPTION OF THE PRIOR ART

Cooling fans have been used to externally cool internal combustion engines of the type placed under the hood of an automobile or like vehicle for many years. Typically, such fans are driven or rotated by a drive shaft secured to and extending outwardly from a water pump wherein the water pump is belt driven by a pulley and belt assembly as a power takeoff of the internal combustion engine. However, in automobiles, light trucks, or like vehicles of the current model line in American made vehicles of this type, the provision of a clutching mechanism or assembly has been added. The inclusion of the clutching mechanism which, may be herein referred to as the fan idling clutch, was provided for purposes of saving energy and was instituted during the years when the United States suffered from an apparent shortage of oil. The structure, placement and operation of the idling clutch assembly is such as to automatically disengage when the vehicle reached relatively high speeds in the proximity of the nationally recognized 55 mile per hour speed limit. The result was savings in used power of the engine while still providing cooling of the engine by the inflowing stream of cooling air wherein there was an alleged savings of from 5% to 8% in fuel consumption.

Due to the modern improvements in American made automobiles such as a considerable reduction in weight of the average American vehicle and further assuming that the enforcement of the national highway speed of 55 miles per hour is recognized in combination with the substantial reduction in costs of gasoline, the need for the idling fan clutch is highly questioned. Such use of the idling fan clutch is further suspect especially when considering the potential damage to be done to the internal combustion engine and repair and maintenance costs involved in the utilization of the subject clutch assembly if such malfunctions.

It is well known that when a vehicle is under heavy load such as when pulling a trailer or when going up a steep incline, such clutch assemblies, of the type herein disclosed, are prone to slippage, failure of the oil seal or, in hot weather conditions, the alteration of the viscosity of the silicone oil associated with the operation of the clutching assembly. These failures in turn result in a serious reduction in the r.p.m. or even a complete stopping of the rotation of the cooling fan. Therefore, overheating of the I.C. engine is frequently a result with the requirement or need to replace or repair the fan idling clutch assembly as well as repair any damage to the engine.

As set forth above, overheating of the engine and continued operation thereof in such overheated state will result in severe damage to the I.C. engine and the requirement of a costly repair thereto. While it is common knowledge that continued use of an overheated I.C. engine will result in the aforementioned damage, there is no direct indication to the operator of the vehicle that the idling clutch mechanism has in fact malfunctioned and that proper cooling of the engine has stopped. By the time conventional gauges indicating engine heat are consulted or noticed, it is common that severe damage has been done to the internal combustion engine resulting in the aforementioned expensive and costly repairs thereto.

In an attempt to overcome certain problems of the type set forth above, the prior art includes various devices, adaptors, etc. of different types for the purpose of overcoming or eliminating the clutching function of the idling fan clutch. However, each of the aforementioned prior art attempts may include distinct disadvantages when put into practical, every day use. None of the prior art attempts include a specific adjustment and/or mounting assembly to insure proper and/or selective positioning of the cooling fan in relation to the distance between the water pump and the radiator. Such positioning provides maximum air cooling capacity in all of the wide variety of existing automobiles on the road of the type which could take advantage of a preferred structured as set forth in the invention herein.

The above set forth prior art attempts include the structure disclosed in the U.S. Pat. No. 3,824,807 to Hect which discloses an adaptor which requires the replacement of the original fan of the car for another fan type or size resulting in the accompanying added expense. The U.S. Pat. No. 4,320,723 to Wendling relates to a structure which includes a series of locking devices to lock the main parts of an idling clutch in order to convert it to a direct drive coupling when the owner of the car desires. However, to accomplish the intent as disclosed in Wendling and to install the aforementioned locking device on existing idlng clutches, the clutch has to be removed from the engine and machined utilizing a series of machine operations which require the included added expense. In addition, the practice of the invention as disclosed in this patent assumes that the car owner will know or recognize when such a locking device is needed and the process for its installation. Failure to properly clutch or unclutch the cooling fan relative to the drive shaft causing its rotation, will also result in overheating which occurs in the aforementioned damage to the engine and attendant costs of repair.

Therefore, there is an obvious need in this area with the demand for use and application on literally millions of automobiles currently equipped with fan idling clutches for a structure and/or assembly which would eliminate the problems associated with the unnoticed failure or reduced performance of fan idling clutches which in turn results in overheating of the internal combustion engine associated therewith. Such a preferred structure or assembly would eliminate the need or requirement of any type of intervening clutch mechanism of the type currently in use and serving to interconnect the driving facility such as the driven water pump and drive pump associated therewith, with the conventional cooling fan located externally and forwardly of the I.C. engine block.

SUMMARY OF THE INVENTION

The present invention is directed to a direct drive coupling assembly designed and positioned to drivingly interconnect and adjustably and selectively position a cooling fan in a preferred position relative to an internal combustion engine and in driven relation with the water pump and driving components associated therewith. More specifically, the direct drive coupling of the present invention is designed to eliminate the need and operation of any type of fan idling clutch mechanism or assembly. The direct drive coupling of the present invention is especially constructed to be easily and efficiently mounted in the aforementioned interconnected relationship to and between the water pump and the cooling fan with conventional tools and without difficulty in moving the tools into engagement with the structures or components used to attached the direct drive coupling in the aforementioned position. Further, the specific design, dimension and configuration of the direct drive coupling assembly eliminates the need for the stocking of different size of parts, couplings, or adaptors therefor and may be utilized in a versatile fashion to interconnect cooling fans of varying sizes in a rotatable, operative fashion relative to the driving water pump facilities and the I.C. engine associated therewith.

The conventional idling fan clutch assembly, to be described in greater detail hereinafter, is not considered part of the present invention, a description thereof is considered to be helpful in the understanding of the present invention. Typically, the idling fan clutch comprises a fluid (viscous) coupling for rotating a fan used in conjunction with the radiator of an internal combustion engine. The clutch assembly includes an input member which is driven by a combination of the water pump, shaft, pulley and belt (driving facilities associated with the water pump). The input member and an output member has spaced apart surface portions defining a shear space therebetween. A fluid shear medium is located within the shear space to transmit torque from the input member to the output member. The output member is connected to the cooling fan and which consequently moves air, when rotated, through or over the liquid cooling radiator. Since the input torque is provided by viscous fluid, there is a differential speed between the input and output members of the clutch assembly. Therefore, the output members and the fan always rotate at a much lower speed than the input member and the water pump shaft.

The present invention therefore is to replace the above described type of fan idling clutch assembly with a direct drive coupling assembly in order to totally eliminate the workings and presence of the clutching assembly from the conventional, relatively current automobile or like vehicle engines. The direct drive coupling assembly of the present invention is relatively inexpensive and may be die cast and substituted readily in the aforementioned primarily American made models of automobiles and like vehicles in order to provide a maximum inflow stream of cooling air, minimize the noise of the engine, prolong the life of the water pump component because of the lightweight of the various components of the subject drivet drive coupling assembly.

The subject direct drive coupling accordingly comprises an elongated one-piece integrally formed support shaft secured at one end in a connected fashion to the water pump for rotation therewith. The opposite end of the support shaft is removably secured to a fan support means preferably in the form of a support disk which extends outwardly in perpendicular relation to the longitudinal axis of the support shaft and into engagement with the cooling fan for rotation thereof.

Another important feature of the present invention is the provision of an adaptor disk secured to and mounted in flush engagement with the support disk so as to rotate therewith.

Interconnection of the support disk to the corresponding end of the support shaft of the direct drive coupling occurs through the provision of key slots and key elements which prevent relative rotation of the suppor disk thereon. Due to the fact that the adaptor disk is fixedly secured to the support disk, relative rotation is thereby prevented between the adaptor disk, support disk and support shaft while all three elements rotate together.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which:

FIG. 1 is a side view in partial section with related components of the assembly and associated cooling system and internal combustion engine represented in phantom lines.

FIG. 2 is a side view in partial section and phantom lines representing details of the embodiment of FIG. 1.

FIG. 3 is an detailed view of a key member associated with assembling certain components of the direct drive coupling assembly of the present invention.

FIG. 4 is a front elevational view in detail of one component of the present invention.

FIG. 5 is a sectional view along line 5—5 of FIG. 8.

FIG. 6 is a front elevational view of one additional component, shown in detail in FIGS. 16 and 17 of the direct drive assembly of the present invention wherein the cooling fan and related portions are represented in phantom lines.

FIG. 7 is an end view along line 7—7 of FIG. 9.

FIG. 8 is a side elevational view of a bushing component associated with the structure of FIG. 9.

FIG. 9 is a side elevational view with related components in phantom lines of another component of the direct drive coupling of the present invention.

FIG. 10 is a sectional view along line 10—10 of FIG. 9.

FIG. 11 is an end view similar to that of FIG. 4.

FIG. 12 is a sectional view along line 12—12 of FIG. 13.

FIG. 13 is a detailed view in partial cutaway in section of the assembled coupling supporting a cooling fan represented in phantom lines.

FIG. 14 is a front elevational view of a nut retainer member shown in assembled form in FIG. 13.

FIG. 15 side view in section and in partially exploded form showing connector elements attaching a cooling fan to one portion of the subject coupling.

FIG. 16 a front elevational view of the structure of FIG. 15.

FIG. 17 is a rear elevational view of the embodiment of FIG. 16.

FIG. 18 is two cooperative components of the coupling assembly of present invention shown in somewhat exploded form and represented in section and phantom lines in part.

FIG. 19 is a front elevational view of the embodiment of FIG. 18.

Like reference numerals refer to like parts throughout the several views of the drawings.

DETAILED DESCRIPTION OF THE PREFERRED EMBODIMENT

As shown primarily in FIGS. 1 and 2, the coupling assembly of the present invention is generally indicated as 10, the components of which are shown throughout the Figures in assembled form and in detail, wherein the coupling 10 is designed to be used for the connection of a cooling fan represented in phantom lines in FIG. 1 and geneally indicated as 12 and more specifically to interconnect the cooling fan 12 to a drive shaft 14 of the water pump 16 generally associated with the housing 18 therefor provided on the front end of an internal combustion engine (not shown).

More specifically, the rotary drive shaft 14 extends forwardly or outwardly from the water pump 16 and associated housing 18 and carries a flange member 20 which is positioned more specifically on an outwardly projecting finger 22. The finger 22 is integrally formed with drive shaft portion 14 and may be considered to include a central longitudinal axis of rotation which also serves as the axis of rotation of the flange 20 wherein such central axis is indicated as 24. The flange 20 also integrally formed to finger 22 and drive shaft 14 includes four outwardly extending stubs 26 offset 90° from one another. The stubs 26 serve as a mounting facility for the support shaft generally indicated as 30 and represented in detail in FIGS. 2 and 9. This is accomplished by a flange 32 integrally formed on one end of the support shaft 30 and shown in detail in FIGS. 4 and 9. The flange 32 includes a plurality of spaced apart (90° offset from one another) open ended slot 34 which are dimensioned and configured to receive the bolts 26 on the flange 20 as set forth above. Connector elements 31 and 33 in the form of washers and nut type members respectively fit over the distal end of the bolts 26 in a conventional manner so as to secure the flange 32 of the support shaft 30 in place as shown in FIG. 2. The outwardly extending finger 22 fits within a central channel or bore 36 formed on the interior of the hub portion 38 of the support shaft 30 wherein such bore 36 communicates through an open end with the flange 32 and allows entry of the finger 22 therethrough (see FIGS. 2, 4, 8 and 9).

With regard to FIGS. 5 and 8, a sizing busing 40 may be utilized to accommodate different sizes of outwardly projecting fingers 22 so as to allow the support shaft 30 as well as the remaining components of the present direct coupling assembly of the present invention to be manufactured in a standard size. Accordingly, while the outwardly projecting finger 22 of the drive shaft 14 may in fact vary dependent upon the size of the engine, water pump, etc. in different automobile makes and styles, the sizing bushing 40 may be used to be placed between the finger 22 and the interior surfaces of the bore 36 so as to accomplish a snug frictional engagement therebetween.

Further with regard to FIGS. 1 and 2, conventional pulley mechanism 44 and 44' may be mounted to drive the shaft 14 of the water pump causing its rotation and operation of the water pump itself wherein such rotary motion provided is due to the connection of the pulleys with the drive belts 45 movably and frictionally engaging the V-shaped peripheries 47 as shown. It is of course noticed that the transverse configuration of the belts 45 are correspondingly formed to fit into the V-shaped periphery 47 of the respective belts.

Turning to the various figures of the drawings, the direct drive coupling assembly of the present invention may be considered to include three important portions including the aforementioned and described support shaft 30, support disc 48 (see FIG. 16) and adaptor disk 60 (see FIG. 19).

More specifically and again with reference to FIG. 9, support shaft 30, additionally includes an elongated one piece integrally formed shank 49 being externally threaded and specifically structured to include two spaced apart, substantially oppositely disposed elongated key ways or slots 50 formed therein. The key ways or slots 50 extend along the length of the externally threaded shank 49 as clearly shown in FIG. 9. As set forth above, it is important to note that these key slots 50 are disposed in substantially 180°, opposed relation to one another about the circumference of the shank 49 and parallel to the central, longitudinal axis of the shaft 24' which in turn is colinear with the central axis 24 of the water pump shaft 14. With reference to FIG. 3, a key element 51 is positioned within each of the key slots 50 (see FIGS. 9 and 10) and the key elements 51 are designed to cooperate with the support disk 48 as shown in FIGS. 16 and 17 which will be explained in greater detail hereinafter.

In a preferred embodiment, the externally threaded surface of the elongated shank 49 is a left-handed fine thread extending along the entire length of the shank portion 49 and is formed thereon to receive left-handed internally fine threaded retaining nuts 52. The retaining nuts are cooperatively positioned such that the actual position of the support disc 48 may be varied and maintained in a preferred position along the length of the externally threaded shank 49 as will be explained in greater detail hereinafter. Locking nut retainers 54 are positioned in sandwiched relation between the nuts 52 and the oppositely disposed surfaces of the support disc 48 as clearly shown in FIGS. 1, 9, and 13. FIG. 10 relates to the nut retainer 54 shown in phantom lines wherein one specific peripheral or outwardly positioned segmented portion as at 54' may be bent into engaging relation with the correspondingly positioned nut 52 as best shown in FIGS. 1, 6 and 13. This outwardly extending or peripheral portion may be bent over generally along a crease line into engagement with one of a plurality of sides or faces on the multi-sided periphery of the retaining nuts 52. It is to be emphasized that the purpose of the utilization of left-handed fine threads (D'30) is to prevent the nuts 52 from becoming loosened as is the tendency during the continuous and extended rotation of the water pump shaft 14. Similarly, the purpose of the nut retainers 54 and their bent over engagement with the periphery of the nuts 52 as at 54' is to accomplish the same purpose. It is assured that the nut retainers 54 will not rotate relative to the shank 49 of the support shaft 30 on which they are mounted due to the integral formation of the outwardly extending key segment 56 formed on the periphery of the central aperture 58 in each of the nut retainers 54. These key segments 56 are dimensioned and positioned of course to fit within the key slots 50 also integrally formed in the shank portion 49 of the support shaft 30 as described in detail above. Further, and again with reference to FIG. 9, the 50' of each of the key slots 50 is opened to allow the inward positioning and sliding of the key elements 51 (see FIG. 3) as well as the key segments 56 of the nut retainers 54. The specific provision of the key slots 50, key elements 51, retaining nuts 52, nut retainers 54 and the internal structure of the support disc 48 (to be explained in greater detail hereinafter) allows for the placement of the support disc 48 at an point along the length of the threaded exterior of the shank 49 and its maintenance at such location. Therefore, the predetermined or preferred distance is between the water pump mounting flange 20 (see FIG. 1) and the radiator generally indicated in phantom lines as 11 in FIG. 1, and the mounting or placement of the cooling fan generally indicated as 12 can be varied somewhat along the length of the threaded shank 49 of the support shaft 30. This preferred positioning of the cooling fan is done in order to produce an optimum inflow of cooling air over or through the radiator 11 of course to accomplish the most efficient cooling during operation of the engine.

Presently there are three different standard sizes of cooling fans supplied or utilized by the manufacturer in the American autmobile industry. These cooling fans 12, 12' and 12" are considered original equipment and come with the vehicles upon purchase. As set forth above in greater detail, in order to provide better or more efficient fuel consumption, such vehicles frequently include a fan idling clutch (not shown in the drawings for purposes of clarity), and the subject direct drive coupling 10 of the present invention is intended to overcome certain disadvantages associated with malfunctioning or breakdown of such an idling clutch assembly.

Accordingly, the structure of the present direct drive assembly 10 is adaptable for use with all three of the standard sizes of the current cooling fans presently in use. For purposes of clarity, the cooling fans are represented in broken lines as 12, 12' and 12" as set forth above.

With reference to FIGS. 16 through 19, the support disc 48 will accommodate the more frequently used two standard sizes of such cooling fans 12 and 12' and the third most popular size of the cooling fan 12", is made of plastic and in use primarily on smaller, four cylinder vehicles such as the Pontiac and Chevette T-1000. The latter third standard size 12" will be attached to the adaptor disc 60 shown in detail in FIG. 19 which in turn is mounted, as will be described, on the support disc 48 for its forced rotation and interconnection to the support shaft 30.

At the present time there are three different sizes of cooling fans supplied by the manufacturers of automobiles which are original in vehicles and driven by the idling clutch. The support disk 48 will accommodate the more frequently used two standard sizes of these cooling fans 12, 12' and the third fan 12" which is made of plastic and used in the small 4-cylinder vehicles such as Pontiac and Chevettes T-1000 will be attached to the adaptor disc 60 and combination which the support disk 48 and remaining parts of the assembly coupling 10 (FIG. 1).

In all three different sizes, cooling fans 12, 12' and 12" have a flat mounting portion 59 perpendicular to axis 24 and peripherally carrying a series of circularly spaced vanes 62, adapted to produce an axial in-flow of air upon rotation of the fan. At its center the mounting portion 59 of the fans contain a circular opening or bore 58, 58', 58"respectively which is utilized for centering the fan with respect to rotary axis 24. Each fan contains four evenly circular apertures or holes 74, 74' and 74" spaced and offset 90° off and disposed radially outward relative to axis 24' through which axial bolts 72, 72' and 72" extends, the bolts are utilized to tighten and secure the fan to a drive structure original to the idling clutch and with the present invention to the support disk 48 or adapter disk 60.

The diameter of the bores are different in each fan, the radius of the holes 72, 72' and 72" are the same between them but different in each fan whith respect to axis 24'. The diameter of holes 74, 74' and 74" correspond to the diameter of bolts 72, 72' and 72".

The support disk 48 is designed to be geometrically balanced in relation to the central axis of rotation 24, as set forth above, and includes opposed surfaces 66 and 68 as shown respectively in FIGS. 16 and 17. The opposed surfaces 66 and 68 are planar and, depending upon the size of the cooling fan (12, 12') such support disc 48 is designed to either directly engage the supporting fan by the central aperture therein as such central aperture 58 or 58' of the supporting fan fits about an outer centrally disposed disc area as at 68', and 66' respectively. Alternately, the third standard size of the cooling fan 12" is secured to the adaptor disc 60 (FIG. 19). The opposite surface 68 of support disk 48 has an outwardly protruding integrally formed rim 68' designed to fit within the central aperture 70 of the adaptor disc 60 as well as the bore 58 of fan 12. Therefore, it should be readily apparent that the outwardly projecting disc portions 66' 68' are designed to fit within the centraly disposed apertures of the two standard size cooling fans 12 and 12'. The third size cooling fan 12"requires the use of an adaptor disc 60 such that the somewhat larger outwardly projecting rim 68' on the opposite face of the support disc 48 is designed to fit within the central aperture 70 of the adaptor disc 60 (see FIGS. 16 through 19).

Also, as shown in FIG. 15, the cooling fan 12' of the type and size shown in FIG. 15 fits on the outer projection 66' and is secured there by a plurality of bolts 72' passing through equally spaced apart apertures 74' in the cooling fan 12' which are aligned with certain ones of the plurality of equally spaced apart (90° offset) apertures 76 formed in the outer peripheral portion 48' being radially spaced from the projections 66' and 68'. The central aperture 58' as shown in FIG. 15 fits over the outer projection 66' such that the inner and outer respective peripheries of the aperture 58' and the outer projection 66' are disposed in mating engagement with one another.

Similarly, as shown in FIGS. 1 and 13, the cooling fan 12 of the type shown herein fits on the outer projection 68 and is secured thereto by a plurality of bolts 72 passing through equally spaced apart apertures 74 in the cooling fan 12. These apertures 74 are aligned with certain ones of the plurality of equally spaced apart (90° offset) apertures 76'formed in the outer peripheral portion 48' of the support disk 48. It should be emphasized that the apertures 76' are at a greater radial distance from the central axis of rotation 24 and the center of support disk 48. To the contrary, the apertures 76 serving to connect the cooling fan 12' to the outwardly projecting portion 66' of support disk 48 are spaced a lesser radial distance from the axis of rotation 24 and the center of the support disk 48. The central aperture 58 of cooling fan 12 shown in FIGS. 1 and 13 fits over the outwardly projection 68' such that the inner and outer respective peripheries of the aperture 58 an the outer projection 68' are disposed in mating engagement with one another.

With regard to the apertures 76 and 76', it should again be emphasized that both of these apertures are internally threaded to receive respectively the bolts 72' and 72 for securement of the respective cooling fans 12' and 12 to the support disk 48. Similarly and with reference to FIGS. 18 and 19, the apertures 79 formed in the outermost peripheral portion of the adaptor disk 60 are also internally threaded to receive the bolts 72" for securement of the cooling fan 12" to the correspondingly positioned face of the adaptor disk 60.

Similarly, when the adaptor disc 60 is utilized, the support disc 48 is effectively "reversed" (or the position of the fan is utilized on the opposite side relative to the position shown in FIG. 1) such that the outer projection 68' fits within the central aperture 70 of the adaptor disc 60. A plurality of spaced apart apertures 78 are formed in the outer projection 80 which extend outwardly from the exposed face 82 of the adaptor disk 60. This projection 80 is positioned for interengagement and support within the interior of the central aperture 58" of the third standard sized cooling fan 12" as shown in FIG. 18. Securement of fan 12" to adaptor disk 60 occurs by bolts 72 passing through apertures 78 and being threaded within spaced apart (90° offset) apertures 76' of support disk 48.

Again with reference to FIGS. 15 through 18, a central aperture 84 is formed in the center of the support disc 48 for surrounding positioning and mounting on the threaded shank 49 of the support shaft 30. The central aperture 84 is not threaded but further includes key spaces 86 extending beyond the peripheral border 84' and provide key spaced 86 for engagement with the key structure 51 shown in FIG. 3 in detail and shown properly mounted at a preferred location along the length of each of the respective key slots 50 being integrally formed in the shank portion 49 of the support shaft 30. Therefore, the positioning of the key structure 51 both in the key slots 50 and in the key spaces 86 of the central aperture 84 of the support disc 48 prevents relative rotation between the support disc 48 and the cooling fan 12 and/or the adaptor disc 60 mounted thereon.

Installation of the direct drive coupling generally indicated as 10 of the present invention is easily accomplished by use of conventional tools. This is accomplished by first removing the idling clutch assembly in its entirely from the drive shaft 14 of the water pump. In most cases the drive clutch assembly can be removed fairly easily and as a single unit. The cooling fan 12 is then of course removed from the clutch assembly, in its entirety, so that the cooling fan can be used separately and in combination with the direct drive coupling 10 of the present invention. Next, the outwardly projecting finger 22 of the drive shaft 14 is inserted into the central open ended bore 36 integrally formed in one end of the support assembly 30 (see FIG. 2) and the open ended slots 34 are secured to the bolts or lugs 26 in the manner described above. Washers and nuts 31 and 33 respectively are of course secured about the distal end of the externally threaded stubs 26 to secure the support shaft in place. The next step is to fit a first one of the locking nut 52 and a first one of the nut retainers 54 over the free end of the shank 49. The key structures 51 are next slid into the open end 50' of the respective elongated key slots 50 formed in the threaded shank 49 of the support shaft 30 (see FIGS. 7, 9 and 10) at the desired location along the length to properly positon the support fan depending upon preferred or maximum inflow of cooling air over the radiator 11 as also previously discussed. The support disc 48 is then slid over the free end of the shank 49 and mounted such that the key spaces 86 are engaged over and aligned with the previously positioned key structures 51. The nuts 52 are then tightened and the nut retainers 54 are bent over at the peripheral portions, as set forth above, into locking engagement with one of the multi-sided periphery of the respectively positioned nuts 52. It should be emphasized that due to this specific configuration, the support disc 48 can be located at any point along the length of the threaded exterior surface of the shank 49 of the support shaft 30 to accomplish maximum or most efficient inflow of air.

Subsequently and depending upon which size of fan is utilized, the fan 12 or 12' is then connected directly to the support disk projections 68' and 66' or alternately the support fan 12' is connected to the adaptor disk 60 and the adaptor disk in turn is mounted on the appropriate face 68 over outer projection 68' of the support disc 48 by means of proper placement of the central aperture 70 of the adaptor disc 60. The conventional connector elements 72 or 72' and/or are positioned as discussed above.

What is claimed is:

1. A direct drive coupling assembly of the type primarily designed to rotatably support and interconnect a cooling fan structure to a drive shaft therefor in an internal combustion engine for an automobile or like vehicle absent any interceding clutch mechanism, said coupling assembly comprising:
   (a) an elongated support shaft of one piece, integral construction mounted at one of two opposite ends thereof to said drive shaft and extending coaxially outwardly therefrom into supporting engagement with the cooling fan structure,
   (b) connecting means for adjustably and selectively securing the cooling fan at any one of a plurality of predetermined locations along the length of said support shaft and at a preferred location relative to a radiator structure of the internal combustion engine,
   (c) fan support means for interconnecting the cooling fan to said support shaft for rotation therewith mounted on said support shaft between said opposite ends thereof and comprising a support disc having a central aperture integrally formed therein and being structured for connection to at least a portion of said connecting means, said support disc disposed in surrounding, coaxial relation to said support shaft,
   (d) said support disc including a fan support structure formed thereon and disposed and configured for direct removable attachment to the cooling fan for support thereon if the cooling fan is within predetermined standard dimensional parameters, said predetermined standard dimensional parameters defined by the dimension of an inside diameter of a central bore of the cooling fan, (e) an adaptor means removably securable to said support disc for direct attachment to and support of a cooling fan structure which is outside of said predermined dimensional parameters and therefore unattachable to said support disc, (f) said adapter means being attached to said support disc in supporting relation to the fan structure only if the fan structure utilized is outside said predetermined dimensional parameters.

2. An assembly as in claim 1 wherein said connecting means comprises a key slot means integrally formed in said support shaft and extending along a length thereof and key means removably mounted within said key slot means and projecting transversely outwardly therefrom and from an outer surface of said support shaft for interconnecting engagement with said support disc, said key slot means and said key means cooperatively disposed and dimensioned to accomplish removable mating engagement with one another and removable mating engagement of said support disc on said support shaft for rotation of said support disc with said support shaft.

3. An assembly as in claim 2 wherein said key means is selectively positionable within said key slot means along the length of said support shaft and secured thereto so as to rotate therewith, said center aperture of said support disc configured to removably engage said key means for rotation of said support disk with said support shaft.

4. An assembly as in claim 3 wherein said support disc is selectively positionable between said opposite ends of said key means and along the length of said support shaft.

5. An assembly as in claim 2 wherein said coupling means comprises two retainer rings each disposed on said support shaft on opposite sides of said support disc and each having a key segment extending outwardly from an inner periphery of a central aperture thereof and being dimensioned and configured for movable engagement with said key slot means of said support shaft so as to rotate with said support shaft.

6. An assembly as in claim 5 wherein said coupling means further comprises two locking nuts disposed on opposite sides of said support disc outboard of said correspondingly positioned retaining rings, said nuts being internally threaded and engaging an externally threaded surface portion of said support shaft for axial movement therealong.

7. An assembly as in claim 6 wherein said a peripheral portion of each of said retainer rings is deformable into flush abutting engagement with a periphery of a correspondingly positioned one of said locking nuts, whereby rotation of the locking nuts is inhibited.

8. An assembly as in claim 6 wherein said locking nuts are selectively positionable into flush engagement with correspondingly positioned ones of said retainer rings and said respective retainer rings are forced into flush engagement with opposite surfaces of said support discs, whereby said support disc is maintained in a preferred, selective position along the length of said support shaft.

9. An assembly as in claim 1 wherein said support disc comprises an integrally formed outwardly extending first rim having a circular configuration, said first rim extending outwardly from one face of said support disc a distance substantially equal to a transverse dimension of an inner periphery of a central aperture of said adapter means, said central aperture of said adapter means having an internal diameter being substantially equal to the outer diameter of said rim for mating and supporting engagement thereon.

10. An assembly as in claim 9 wherein said adapter means comprises an adapter disc disposed in flush engagement with said support disc and extending radially outward therefrom and mounted thereon for rotation therewith.

11. An assembly as in claim 10 wherein said adapter disc comprises a first set of connecting apertures disposed therein in aligned registry with a second set of connecting apertures on said support disc and said adapter disc secured to said support disc by connector elements passing through said plurality of aligned first and second sets of connector apertures.

12. An assembly as in claim 9 wherein said fan support structure comprises a circularly configured second rim extending outwardly from a face of said support disc oppositely disposed to said one face on which adapter means is mounted, said second rim engaging the inner periphery of a central aperture of a cooling fan for support thereof and securement thereto.

13. An assembly as in claim 12 wherein said support disc comprises a second set of connecting apertures disposed in alignment with connecting apertures of the cooling fan structure, a plurality of connectors extending through aligned pairs of said aforementioned connecting apertures for securement of the cooling fan to said support disc when it is required to use a cooling fan within said predetermined dimensional parameters and said adapter means is not being used.

* * * * *